United States Patent
VanBlon et al.

(10) Patent No.: US 10,296,207 B2
(45) Date of Patent: May 21, 2019

(54) CAPTURE OF HANDWRITING STROKES

(71) Applicant: Lenovo (Singapore) Pte. Ltd., Singapore (SG)

(72) Inventors: Russell Speight VanBlon, Raleigh, NC (US); John Weldon Nicholson, Cary, NC (US); Jianbang Zhang, Cary, NC (US); Joshua Neil Novak, Wake Forest, NC (US); Jon Wayne Heim, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 14/580,334

(22) Filed: Dec. 23, 2014

(65) Prior Publication Data
US 2016/0180160 A1   Jun. 23, 2016

(51) Int. Cl.
*G06F 3/0488* (2013.01)
*G09G 5/24* (2006.01)

(52) U.S. Cl.
CPC .......... *G06F 3/04883* (2013.01); *G09G 5/24* (2013.01); *G09G 2340/12* (2013.01)

(58) Field of Classification Search
None
See application file for complete search history.

(56) References Cited

U.S. PATENT DOCUMENTS

| 2003/0071850 A1 | 4/2003 | Geidl |
| 2009/0159342 A1* | 6/2009 | Markiewicz ............ G06F 3/038 |
| | | 178/18.01 |
| 2010/0289820 A1 | 11/2010 | Hoyer et al. |

FOREIGN PATENT DOCUMENTS

| CN | 1614545 A | 5/2005 |
| CN | 101350068 A | 1/2009 |
| EP | 1363183 A2 | 11/2003 |

OTHER PUBLICATIONS

Formworks, Jun. 2012.*
Moore, Nov. 2011.*
Samsung Galaxy Note 4, Sep. 2014.*
Galaxy Note 4, additional screenshots.*

* cited by examiner

*Primary Examiner* — Mark Roz
(74) *Attorney, Agent, or Firm* — Ference & Associaets LLC

(57) ABSTRACT

One embodiment provides a method, including: providing, on an input and display device, an input field overlay application occupying an initial area of the input and display device, the input field overlay application overlaying an input field of an underlying application; accepting, using the input and display device, one or more handwriting input strokes provided to the input field overlay application; and resizing, on the input and display device, the initial area. Other embodiments are described and claimed.

20 Claims, 4 Drawing Sheets

CAPTURE OF HANDWRITING STROKES

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

BRIEF SUMMARY

In summary, one aspect provides a method, comprising: providing, on an input and display device, an input field overlay application occupying an initial area of the input and display device, the input field overlay application overlaying an input field of an underlying application; accepting, using the input and display device, one or more handwriting input strokes provided to the input field overlay application; and resizing, on the input and display device, the initial area.

Another aspect provides an electronic device, comprising: an input and display device; a processor; and a memory that stores instructions executable by the processor to: provide, on the input and display device, an input field overlay application occupying an initial area of the input and display device, the input field overlay application overlaying an input field of an underlying application; accept, using the input and display device, one or more handwriting input strokes provided to the input field overlay application; and resize, on the input and display device, the initial area.

A further aspect provides a product, comprising: a storage device having code stored therewith, the code being executable by a processor of an electronic device and comprising: code that provides, on an input and display device, an input field overlay occupying an initial area of the input and display device; code that detects one or more handwriting input strokes provided to the input field overlay; code that determines a change for the initial area; and code that resizes, on the input and display device, the initial area.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
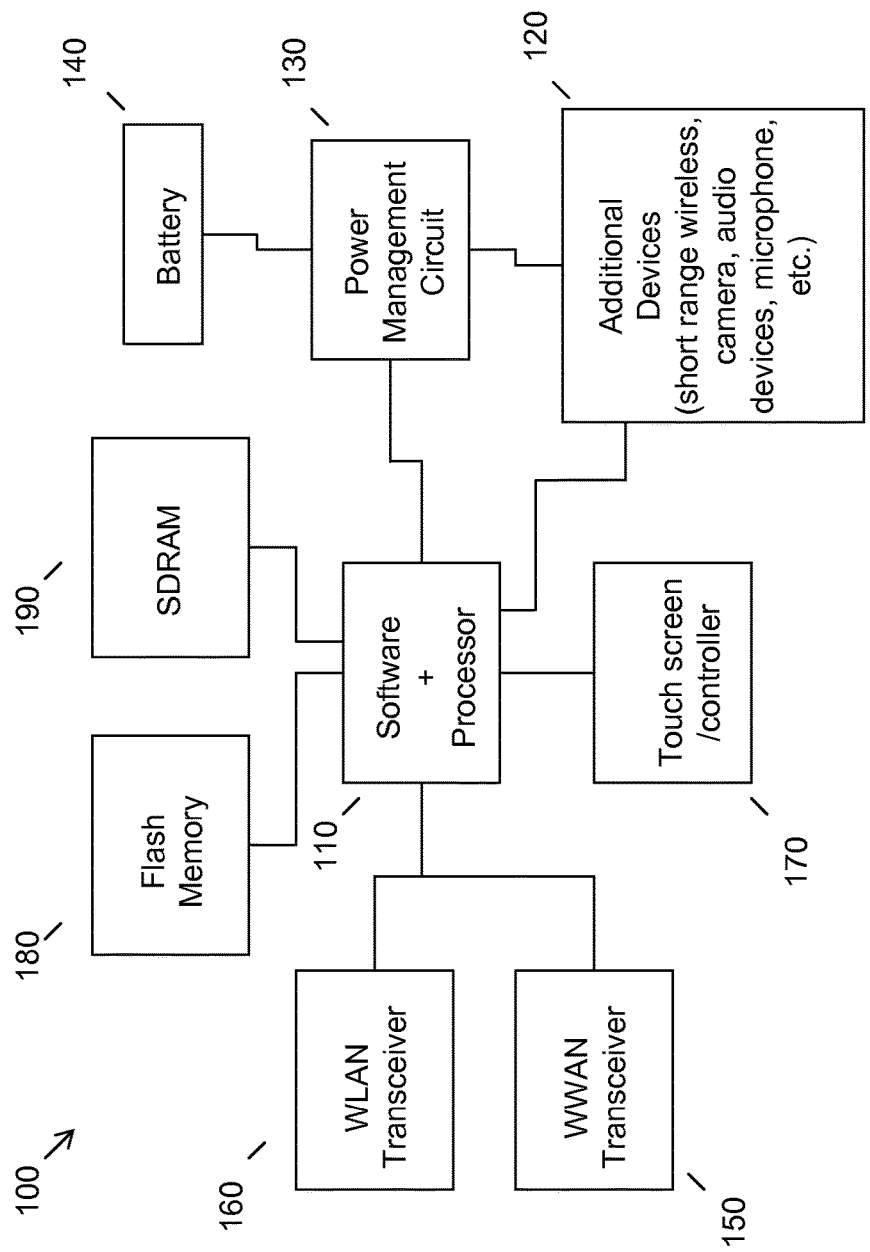
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Capturing pen input in a field is difficult. It requires the user to start and remain in the provided field with every pen stroke. For example, if the user writes "123 Elm St" into the field, he or she must start in the field for each word or else the pen input will not be captured. This problem gets worse as the length of text gets longer, as it may not fit within the field. Because the user must start in the field each time and then lift the pen to start writing again, it is inconvenient and causes user frustration.

An embodiment enlarges the input field overlay such that the user is not so confined in terms of a static input field. For example, an embodiment may enlarge the field overlay size with a buffer area once the user starts writing. This allows handwriting input strokes that normally would fall outside of the field to be directed into the field or captured by the field, as would be expected by the user.

The buffer size may be static or dynamically determined, and may be based on the topmost, bottommost, leftmost, and/or rightmost boundary and resized (increased or decreased), e.g., as the handwriting input comes within a threshold distance of those boundaries. Alternatively, the buffer size may be a percentage of the screen or stroke or letter size. The left or right boundary for example may grow on a different scale (larger buffer) as compared to, for example, the top or bottom, since the user will typically reach the right boundary before the bottom boundary, assuming a left to right input language setting is being used. This may be adjusted for other languages and contexts, e.g., inverted for right-to-left languages, changed for top to bottom character input, etc.

In an embodiment, the input field may be enlarged to fill the entire screen. Resizing to fill the entire screen may be done dynamically, e.g., in response to user ink strokes, by user configuration or selection, or a combination of the foregoing. This allows the user to write anywhere on the screen and the system directs the pen input to the original field. In such scenarios, e.g., adjusting the input field incrementally or dynamically or adjusting the input field to occupy the entire screen, the input field overlay may shrink back down to a standard size or another, reduced size, e.g., according to a detected factor or factors.

For example, when the user stops writing for a predetermined period of time the input field may be reduced in size. When a valid contextual input can be confirmed and no other input is needed, e.g., the user inputs a first name into a first name field of an underlying application, the input field may be reduced in size. When the user manually switches fields via onscreen button or physical button to collapse the overlay field and process the input strokes the input field may be reduced in size. The input field may be reduced in size when the user selects another field with the pen or finger, etc. The input field may be reduced in size when, for example, the user hovers the pen or finger over another field, when the user hovers the pen/finger over a control to submit a form or change pages (if applicable), the user gestures on top of another field via configurable gesture (e.g., double tap, press and hold, etc.) via pen or finger input, the pen is moved a certain distance away from the screen, the user looks at another field, window title bar, application, or button/control (e.g., as detected via eye tracking), etc. Additionally, the field overlay may be filled with text and trigger a reduction in input field size.

Even if one of the scenarios above occurs, however, the overlay input field may remain at an increased size for a predetermined amount of time before shrinking back to the original size. This accommodates a user by offering additional time to add new words, make edits or corrections to prior ink strokes, etc. The input field also may partially shrink down, e.g., if the user's input strokes occur closer to the original field. This would allow the field overlay to dynamically grow or shrink as the user writes, depending on where the most recent strokes occurred.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There is a power management chip(s) 130, e.g., a battery management unit, BMU, which manages power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
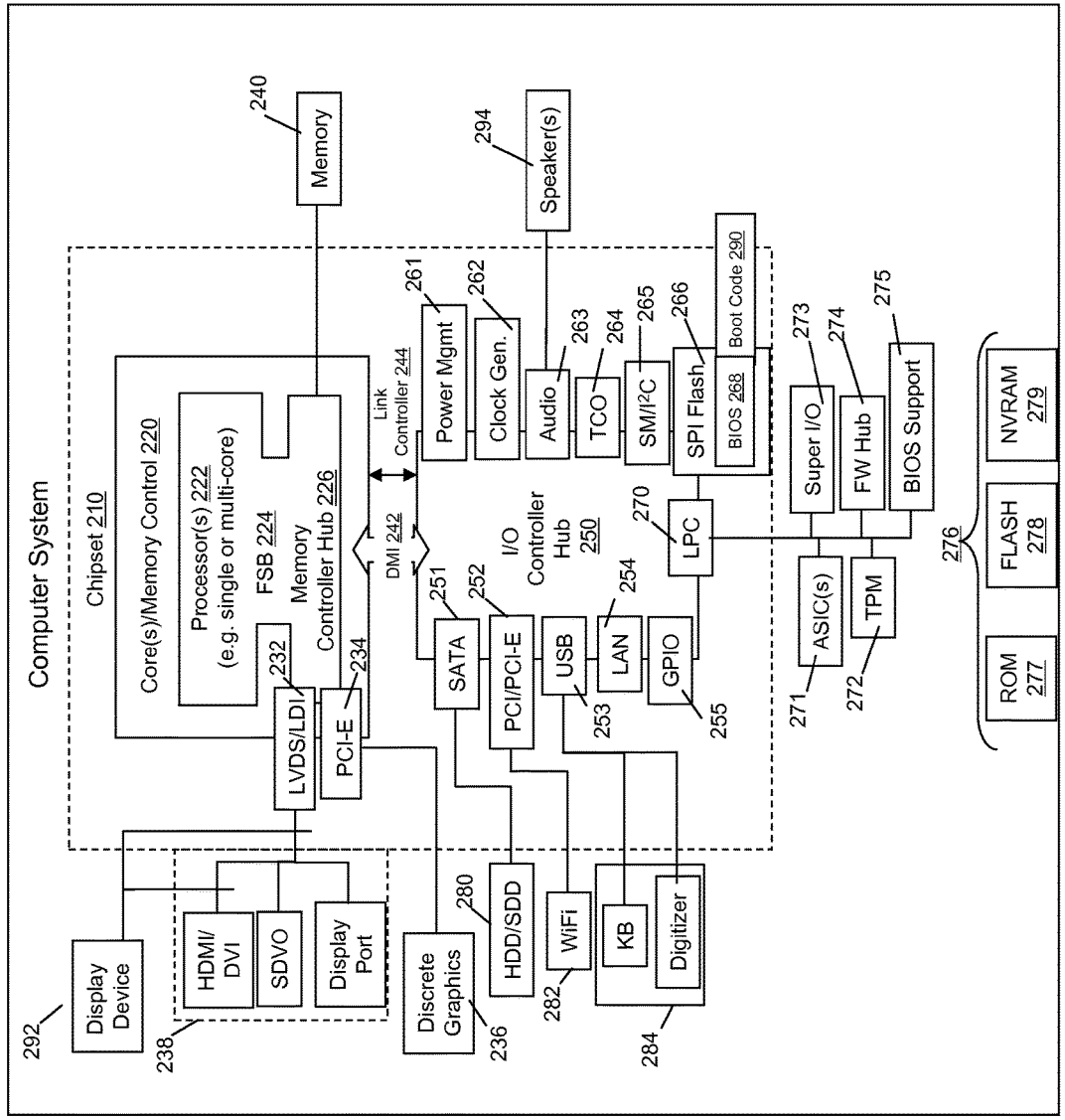
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input devices, security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices such as payment kiosks, etc. Users may employ these devices for various functions, e.g., inputting handwriting strokes as an input modality to an internet search application, an email application, a text messaging or instant messaging application, an e-signature application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes, e.g., from an active pen or stylus, from a passive pen or stylus, from a finger tip, etc., and provides visual displays of input strokes such as characters, conversions of handwritten characters or strokes to machine text, presentation of an input field overlay and the like.

Figure 3:
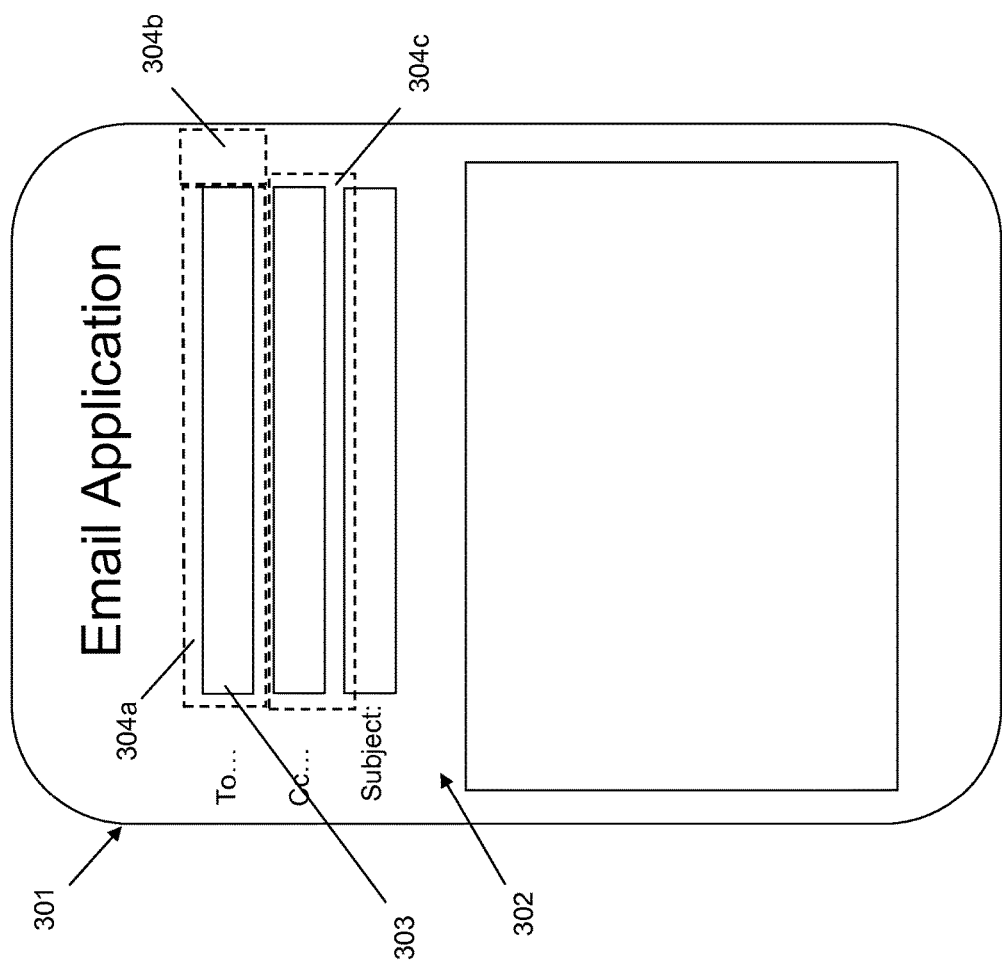
FIG. 3 illustrates an example of a changing input field overlay.

Referring now to FIG. 3, a touch screen display 301 provides an underlying application 302, here an email application. The email application includes "To," "Cc" and "Subject:" fields, as illustrated. These underlying fields support handwriting inputs.

In order to capture ink strokes for these underlying fields, an embodiment provides an initial input field overlay 304a. The initial input field overlay 304a may be transparent (e.g., clear) or the input field 304a may be visually distinguished from the underlying input field of the email application 302. Thus, the dashed outline of overlay input field 304a is not necessarily presented but is used for clear illustration of an example area change, as further described herein. Likewise, other visual indications may be provided. For example, an activated field may be provided with highlighting around its periphery and/or an additional display, e.g., popup window or bubble may be provided in association with an activated or focused field.

The input field overlay 304a may be provided responsive to a user input, e.g., a user selecting an underlying field with a pen tip or a user simply beginning to provide ink strokes associated with (e.g., over, within) an underlying field. For example, a user may place his or her pen tip within the area of the underlying "To" field in order to focus or activate it. Likewise, a user might start providing substantive ink strokes over top of the "To" field to focus or activate the underlying field.

Input handwriting strokes provided within the initial input field overlay 304a may be converted by a handwriting recognition engine of the device to machine text, e.g., entered into the "To" field. Alternatively or in addition to converting the ink strokes, the ink strokes may be input as an image, e.g., inputting an image or graphic of the user's signature into the body of the email application. Thus, the input and display device 301 provides the user with an initial input field overlay 302 that accepts handwriting input strokes.

As described herein, conventionally a user is bound to stay within the initial area of the input field overlay, e.g., area 304a. That is, handwriting input strokes (or parts thereof) that are provided outside of the area 304a of input field overlay are not detected as handwriting input by the device. This circumscribes the area available to the user for providing handwriting input strokes. As may be appreciated, this represents a technical difficulty in that a user may not be able to stay with the input field overlay area 304a, may not be able to fit the handwriting input into the input field overlay 304a, etc. In addition to being inconvenient, this increases the probability that the handwriting input strokes will not be accurately converted to machine text as any partial strokes outside of area 304a may be disregarded by conventional input systems.

Accordingly, an embodiment implements a buffer or buffers (illustrated in this example as areas 304b and 304c) to the input field overlay 304a. As may be appreciated from review of FIG. 3, an embodiment adjusts or changes the input field overlay area 304a to better accommodate a user as he or she provides handwriting input strokes. This permits the user to provide handwriting input strokes to additional areas (304b, 304c) of the input and display device 301, improving the accuracy of recognition of the handwriting input strokes and making the handwriting input method easier and more user friendly.

As described herein, an embodiment may implement a change to the input field overlay 304a in a variety of ways. In one example, additional area, e.g., 304b and/or 304c is/are added as needed, e.g., based on the user's handwriting input stroke size, location, or content. Specifically, if a user has begun inputting a handwriting input stroke that extends below the initial input field overlay area 304a, an embodiment may resize the input field overlay area 304a by area 304c. Similarly by way of example, if the user's input directionality is left to right, as the user handwriting input approaches the right most boundary of the input field overlay area 304a, an embodiment may extend the input field overlay by area 304b. The same may be done for extending the input field overlay in other directions.

In an embodiment, the entire (or substantially the entire) input and display device 301 area may be used as the input field overlay. This may be done dynamically, e.g., based on detection of the user needing additional area for use as an input field overlay. This extension of the initial input field overlay 304a to the entire screen may be done as a default setting or may be implemented as a result of learning from a user's history of inputs. Thus, for a user that frequently requires large buffers or extensions of the initial input field overlay area 304a, the system may begin extending the input field overlay to substantially the entire screen as soon as an underlying input field is activated or as soon as a user beings writing.

In an embodiment, the input field overlay 304a (and change or buffer areas 304b, 304c, etc.) may be presented in an opaque, transparent or semi-transparent fashion. The transparency factor or degree may be adjusted by the user. A user may, for example, desire to have visual feedback as to where the input field overlay is, and how it has changed, such that the user is apprised that the system is adjusting to his or her unique writing style and input requirements. Other users may not wish to have such feedback, and the input and overlay field may be provided in a transparent fashion.

Having resized or changed the initial input field overlay area 304a to include one or more of area 304b, 304c and/or other areas, an embodiment now accepts handwriting input strokes in these extended areas, which may include the entirety of the input and display device area 301, such that handwriting input strokes are mapped or collapsed into the underlying input field, e.g., the "To" field of the example email application illustrated. This mapping or reduction may be actual or logical. For example, converted machine text of a user's input ink strokes may be placed into an underlying input field on the fly, e.g., every five words, etc. For input of unconverted, e.g., image or graphical input, an animated repositioning of the handwriting input strokes may be provided.

Figure 4:
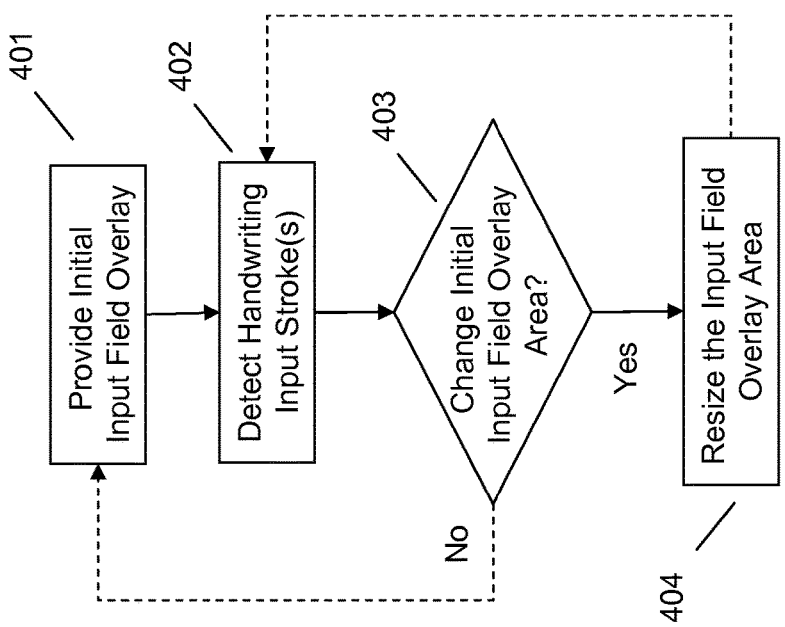
FIG. 4 illustrates an example method of changing the input field overlay size.

As illustrated in FIG. 4, an embodiment therefore provides, on an input and display device, an input field overlay occupying an initial area of the input and display device at 401. Thereafter, one or more handwriting input strokes are provided to the input field overlay and are detected at 402. This permits an embodiment to determine a change for the initial area at 403, if necessary. For example, an embodiment may notice that the user's average handwriting stroke is larger than the initial area provided for the input field overlay and enlarge the input field overlay vertically, e.g., above and below. Given the change determined at 403, if any, an embodiment may thereafter resize, on the input and display device, the initial area at 404 to accommodate the user's particular handwriting input style.

An embodiment may base the determining of a change on the user's handwriting strokes in real-time. Alternatively or additionally, a user's history of handwriting inputs may be used to infer, predict or adjust to the appropriate resizing or the initial size provided for a user. The resizing for example may be based on a handwriting stroke's proximity to a boundary of the input field overlay. Likewise, the determining of a change to the input field overlay may be based on the handwriting strokes' direction of input, e.g., left to right, in order to determine the input field overlay's area should be increased in that direction. This may be accomplished using additional data, e.g., word prediction that indicates additional area is likely required to complete a logical input that is sequentially detected left to right.

In an embodiment, the resizing changes the initial area incrementally. In the left to right input example, the initial area may be incrementally increased in one direction, e.g., to the right, to accommodate additional right most handwriting strokes. Alternatively, the resizing may change the initial area to occupy substantially the entire input and display device at once, without an incremental change. Again, this may take place in real-time, e.g., based on prior input handwriting strokes, or may be accomplished predictively, e.g., based on a stored history of a user's past handwriting input characteristics.

Just as the input field overlay area may be increased in size, so it may be decreased or reduced in size as well. For example, an embodiment may reduce, on the input and display device, a changed area of the input and display device occupied by the input field overlay (e.g., an increased size input field overlay may be reduced in size). The reducing may include reducing the changed area to the initial area or to some other area (e.g., partial reduction).

The reducing may occur after detecting a factor that indicates the initial area should be reduced, or an increased area (or sub area) should be reduced. For example, an embodiment may use a factor such as detection of no input strokes for a predetermined time, detection of contextual input stop confirmation (e.g., word completed), detection of a manual switch input (e.g., soft button press), detection of manual selection input (e.g., pen press into an underlying input field), detection of a predetermined gesture input, detection of a predetermined pen input (e.g., pen removed), and detection of a predetermined eye tracking input (e.g., eye focus no longer associated with the same underlying input field).

The various example embodiments described herein represent a technical improvement to input devices and handwriting input processing used for handwritten input strokes. Example embodiments have been described that enable a user to provide different types of handwriting input strokes (e.g., increased size, increased duration and content, etc.) that provide the user with substantially more flexibility in use of handwriting input. Handwriting input is often avoided by users because conventional input techniques and devices are cumbersome to use and non-intuitive. Embodiments therefore represent technical improvements to these devices and techniques that will facilitate increased adoption of electronic handwriting as a viable input modality. Moreover, because of the adjusted, changed or resized input field overlays provided herein, handwriting recognition accuracy and conversion are improved.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
providing, on an input and display device, an input field overlay application occupying an initial area of the input and display device, the initial area of the input field overlay application substantially overlaying an input field of an underlying application wherein the input field of the overlay application and the input field of the underlying application are visible at the same time, and wherein the input field overlay application receives user input and transmits the user input to the underlying application;
accepting, using the input and display device, one or more handwriting input strokes provided to the input field overlay application, wherein at least a portion of the provided one or more handwriting input strokes occupy an area outside the input field overlayed by the initial area; and
resizing, at substantially the same time as the one or more handwriting input strokes are accepted and on the input and display device, the initial area, wherein the resizing comprises dynamically adjusting a size of the initial area in any direction to a size that encompasses the portion of the one or more handwriting input strokes provided outside the initial area.

2. The method of claim 1, wherein the resizing is based on the one or more handwriting strokes.

3. The method of claim 2, wherein the resizing is based on the one or more handwriting strokes proximity to a boundary of an input field of an underlying application.

4. The method of claim 2, wherein the resizing is based on a direction of input of the one or more handwriting strokes.

5. The method of claim 1, wherein the resizing comprises changing the initial area incrementally.

6. The method of claim 5, wherein the initial area is incrementally increased in one direction.

7. The method of claim 1, wherein the resizing comprises changing the initial area to occupy substantially the entire input and display device.

8. The method of claim 1, further comprising reducing, on the input and display device, a changed initial area.

9. The method of claim 8, wherein the reducing comprises reducing the changed area to the initial area.

10. The method of claim 8, wherein the reducing occurs after detecting a factor selected from the group consisting of: no input strokes for a predetermined time, contextual input stop confirmation, manual selection input, predetermined gesture input, predetermined pen input, and predetermined eye tracking input.

11. An electronic device, comprising:
an input and display device;
a processor; and
a memory that stores instructions executable by the processor to:
provide, on the input and display device, an input field overlay application occupying an initial area of the input and display device, the initial area of the input field overlay application substantially overlaying an input field of an underlying application wherein the input field overlay application and the input field of the underlying application are visible at the same time, and wherein the input field overlay application receives user input and transmits the user input to the underlying application;
accept, using the input and display device, one or more handwriting input strokes provided to the input field overlay application, wherein at least a portion of the provided one or more handwriting input strokes occupy an area outside the input field overlayed by the initial area; and
resize, at substantially the same time as the one or more handwriting input strokes are accepted and on the input and display device, the initial area, wherein to resize comprises to dynamically adjust a size of the initial area in any direction to a size that encompasses the portion of the one or more handwriting input strokes provided outside the initial area.

12. The electronic device of claim 11, wherein the initial area is resized based on the one or more handwriting strokes.

13. The electronic device of claim 2, wherein the initial area is resized based on the one or more handwriting strokes proximity to a boundary of an input field of an underlying application.

14. The electronic device of claim 12, wherein the initial area is resized based on a direction of input of the one or more handwriting strokes.

15. The electronic device of claim 11, wherein the resizing comprises changing the initial area incrementally.

16. The electronic device of claim 15, wherein the initial area is incrementally increased in one direction.

17. The electronic device of claim 11, wherein to resize comprises changing the initial area to occupy substantially the entire input and display device.

18. The electronic device of claim 11, wherein the instructions are further executable by the processor to reduce, on the input and display device, a changed initial area.

19. The electronic device of claim 18, wherein the reducing comprises reducing the changed area to the initial area.

20. A product, comprising:
a storage device having code stored therewith, the code being executable by a processor of an electronic device and comprising:
code that provides, on an input and display device, an input field overlay application occupying an initial area of the input and display device, the initial area of the input field overlay application substantially overlaying an input field of an underlying application, wherein the input field overlay application and the input field of the underlying application are visible at the same time, and wherein the input field overlay application receives user input and transmits the user input to the underlying application;
code that accepts one or more handwriting input strokes provided to the input field overlay application, wherein at least a portion of the provided one or more handwriting input strokes occupy an area outside the input field overlayed by the initial area; and
code that resizes, at substantially the same time as the one or more handwriting input strokes are accepted and on the input and display device, the initial area, wherein the code that resizes comprises code that dynamically adjusts a size of the initial area in any direction to a size that encompasses the portion of the one or more handwriting input strokes provided outside the initial area.

\* \* \* \* \*